United States Patent [19]

Bergeron

[11] Patent Number: 4,644,476
[45] Date of Patent: Feb. 17, 1987

[54] DIALING TONE GENERATION

[75] Inventor: Lawrence E. Bergeron, North Andover, Mass.

[73] Assignee: Wang Laboratories, Inc., Lowell, Mass.

[21] Appl. No.: 625,934

[22] Filed: Jun. 29, 1984

[51] Int. Cl.$^4$ .............................................. G10L 5/00
[52] U.S. Cl. ................................. 364/513.5; 381/51; 379/361
[58] Field of Search ...................................... 381/51-53; 340/534; 364/578, 513.5; 179/84 VF

[56] References Cited

U.S. PATENT DOCUMENTS

| 3,087,989 | 4/1963 | Kunichi et al. | 381/51 |
| 3,158,685 | 11/1964 | Gerstman et al. | 364/513.5 |
| 3,746,791 | 7/1973 | Wolf | 381/51 |
| 4,103,105 | 7/1978 | Akiyama et al. | 179/84 VF |
| 4,542,524 | 9/1985 | Laine | 381/53 |

Primary Examiner—E. S. Matt Kemeny
Attorney, Agent, or Firm—Michael H. Shanahan; Kenneth L. Milik

[57] ABSTRACT

The manner of configuring a voice synthesizer to cause it to emit standard dialing signals.

33 Claims, 2 Drawing Figures

DIALING TONE GENERATION

BACKGROUND OF THE INVENTION

This invention relates to communication systems and more particularly to the generation of dialing tones.

Office automation products frequently need to generate synthetic speech to communicate with operating personnel, and additionally need to generate dialing signals for dialing through the telephone network. In the past one piece of equipment has been used to generate the dialing signals and another to effect the speech synthesis, with attendent costs.

Sixteen standard signals are used for dialing through the telephone system, each associated with one of the digits, or with one of the supplementary symbols *, #, A, B, C, or D. The characteristics of the dialing signals are given in specification RS-464, a recognized industry standard. The salient features of the specification are that each of the standard dialing signals is composed of two frequency components, one from a group of higher frequencies and one from a group of lower frequencies. In particular the frequencies associated with the signals given in Table 1.

TABLE 1

| dialing signal | high frequency | low frequency |
| --- | --- | --- |
| 1 | 1209 Hz | 697 Hz |
| 2 | 1336 | 697 |
| 3 | 1477 | 697 |
| 4 | 1209 | 770 |
| 5 | 1336 | 770 |
| 6 | 1477 | 770 |
| 7 | 1209 | 852 |
| 8 | 1336 | 852 |
| 9 | 1477 | 852 |
| 0 | 1336 | 941 |
| * | 1209 | 941 |
| # | 1477 | 941 |
| A | 1633 | 697 |
| B | 1477 | 770 |
| C | 1633 | 852 |
| D | 1633 | 941 |

The standard requires that the frequency components be within 1.5% of their nominal values given above and that the level of the high frequency component of a pair be not less than and not greater than 4 db above the level of the lower frequency component.

In general, dialing signal generators have employed resonant circuits or structures readily related to the simple oscillations called for in the signals. Speech synthesizers, in contrast, are modeled on the physiological structure for producing vocalizations and have input parameters relating in a simple way to vocalization. Synthesizers have a great range of input values and a correspondingly large range of output sounds, but it is not evident how to specify the input value to stimulate the synthesizer to produce an output with two particular frequency components, or for that matter whether it can be done at all.

SUMMARY OF THE INVENTION

This invention sets forth the configurations for operation of a voice synthesizer to cause it to emit the several dialing signals, and thereby permits a voice synthesizer to signal through the telephone system without need of an independent signal generator.

DETAILED DESCRIPTION OF THE INVENTION

Figure 1:
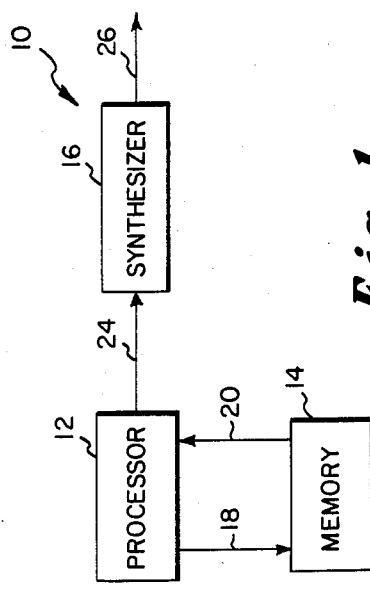
FIG. 1 shows a subsystem for practicing the invention. The subsystem may be part of a office information or communication system.

Referring to FIG. 1, a subsystem 10 suitable for practicing the invention includes a program controlled processor 12, a memory 14 for storing addressable data, and voice synthesizer 16. The processor 12, which may be an Intel 8031, sends address signals to the memory on channel 18 and receives data corresponding to the address on channel 20. The processor 12 sends input data to the synthesizer 16 on channel 24, and the synthesizer 16 emits an analog output on channel 26. Additional channels for control and timing signals (not shown) are provided and are according to well known technology. Processor 12 and memory 14 are conventional components well known and commercially available, needing no further description to those skilled in the computer and communication art. The synthesizer 16 may be a standard commercially available component such as one made by General Instruments and sold under the designation SP 0250.

Figure 2:
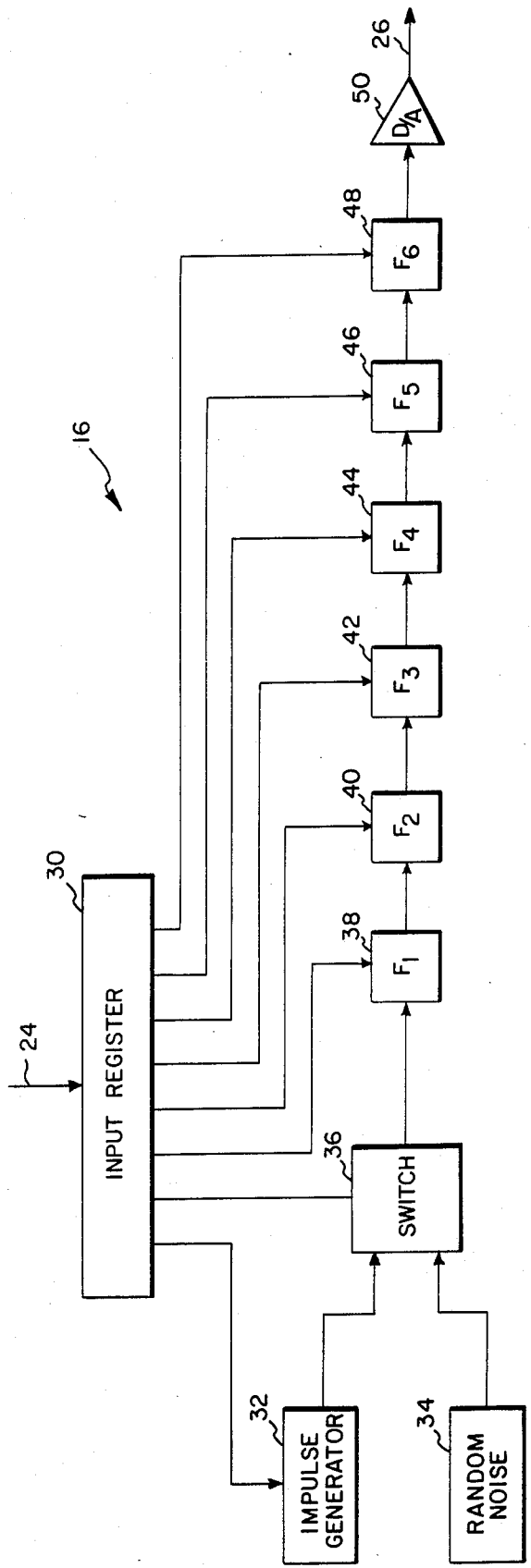
FIG. 2 shows parts and organization of a voice synthesizer shown in FIG. 1.

Synthesizer 16, as shown particularly in FIG. 2, has an input register 30 with 120 bit positions, an impulse generator 32, a ramdom noise generator 34, a impulse/-noise switch 36, 6 digital filters 38, 40, 42, 44, 46, and 48, and digital-to-analog converter 50. Input register 24 is connected to receive input data on channel 24. Control channels run from register 30 to each of the filters and to the switch and impulse generator to control their respective configurations. In particular, for the General Instrument SP 0250, the settings of register bits 41-48 control the operating frequency of the impulse generator and the settings of bits 1-16, 25-40, 49-64, 73-88, 89-104, and 105-120 control respectively the band width and center frequency of the filters F1, F2, F3, F4, F5, and F6.

In operation, the processor 12 obtains from memory or other source a 120-bit code specifying the sound that synthesizer 16 is to emit. The 120-bit code is loaded into register 30 in 15 8-bit groups. The register then transmits signals in accordance with its loaded code to control the configuration of the six filters, the switch and the impulse generator as well as some other parameters such as level and duration of the output. A signal is then selected from either the impulse generator or the noise generator, passes through the filters, is converted to analog form and is emitted at output channel 26.

It have now found the characteristics required for the impulse generator and the filters to produce the standard dialing tones at the output 26. For production of any of the tones the impulse generator is selected as the signal source and two of the filters are actively used. Any two of the six filters may be used as the active ones, the others being effectively configured to produce no attenuation of the signal. The values of operating frequency for the impulse generator, and the band width and center frequency for each of the two active filters is given for each dialing tone in Table 2.

TABLE 2

| DTMF tone | Filter (in hertz) Band-width | Filter (in hertz) Center frequency | Impulse Generator frequency |
|---|---|---|---|
| 1 | 15.6, 6.2, | 700.0 1199.4 | 100.00 |
| 2 | 12.5, 6.2, | 703.4 1337.2 | 70.42 |
| 3 | 21.9, 9.4, | 693.3 1480.9 | 86.95 |
| 4 | 25.1, 12.5, | 761.1 1194.4 | 108.70 |
| 5 | 12.5, 25.1, | 1351.1 761.1 | 192.31 |
| 6 | 21.9, 9.4, | 777.6 1465.3 | 86.20 |
| 7 | 21.9, 12.5, | 854.2 1212.6 | 172.41 |
| 8 | 34.6, 15.6, | 843.4 1349.7 | 121.95 |
| 9 | 6.2, 15.6, | 1466.5 847.2 | 121.95 |
| 0 | 6.2, 3.1, | 936.8 1355.2 | 104.17 |
| * | 6.2, 12.5, | 1197.7 932.1 | 133.33 |
| # | 12.5, 6.2, | 932.1 1466.5 | 133.33 |
| A | 25.1, 9.4, | 689.1 1631.3 | 232.56 |
| B | 18.8, 6.2, | 767.1 1632.3 | 96.15 |
| C | 6.2, 3.1, | 842.9 1633.2 | 49.50 |
| D | 9.4, 18.8, | 1631.3 927.4 | 116.28 |

Specifically for the General Instruments Corporation model SP 0250, the code to produce the parameters given in Table 2 is given in Table 3. The values in Table 2 give in hexidecimal notation inputs to be loaded into register 30 to produce each of the dialing signals. The eight-bit code controlling the impulse generator operating frequency is to be loaded into bits 41-48 of the register; the 16-bit code controlling the configuration of the first active filter is to be loaded into any of bit sequences 1-16, 25-40, 49-64, 73-88, 89-104, or 105-120. The 16-bit code controlling the configuration of the second active filter is to be loaded into one of the remaining 16-bit sequences. Non-active filters controlled by the remainder of the 16-bit sequences are loaded with 00 (hex).

TABLE 3

| DTMF tone | First Filter (in hex) | Second Filter | Impulse Generator |
|---|---|---|---|
| 1 | 7BD7 | 7EB8 | 63 |
| 2 | 7CD7 | 7EB0 | 8D |
| 3 | 79D7 | 7DA7 | 72 |
| 4 | 78D2 | 7CB8 | 5B |
| 5 | 7CAF | 78D2 | 33 |
| 6 | 79D1 | 7DA8 | 73 |
| 7 | 79CB | 7CB7 | 39 |
| 8 | 75CB | 7BAF | 51 |
| 9 | 7EA8 | 7BCC | 51 |
| 0 | 7EC5 | 7FAF | 5F |
| * | 7EB8 | 7CC5 | 4A |
| # | 7CC5 | 7EA8 | 4A |
| A | 78D7 | 7DA1 | 2A |
| B | 7AD2 | 7EA1 | 67 |
| C | 7ECD | 7FA1 | C9 |
| D | 7DA1 | 7AC5 | 55 |

The specific code values and positions of loading required will vary from one model of synthesizer to another. The appropriate values and positions for any particular model of synthesizer in order to effect the configurations set forth in Table 2 can be worked out readily by those skilled in the art from the manufacturer's specifications. In some cases the synthesizer specifications may be given in terms of Linear Predictive Coding rather than terms of band width and center frequency. The methods for interconversion between the two methods of specifying a filter characteristic are well known to those skilled in the art. The use of synthesizers specified in Linear Predictive Coding or other modifications in design are within the scope of the claims.

What is claimed is:

1. A method for stimulating a voice synthesizer to emit DTMF dialing tone "1" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 700.0 Hz and a band width of 15.6 Hz, entering data in said input register to control the parameters of a second of said filter sections such that the second filter section will be set to have a center frequency of 1199.4 Hz and a band width of 6.2 Hz, entering data in said input register to control the parameters of said impulse generator such that the impulse generator will operate at 100.00 Hz.

2. A method for stimulating a voice synthesizer to emit DTMF dialing tone "2" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 703.4 Hz and a band width of 12.5 Hz, entering data in said input register to control the parameters of a second of said filter sections such that the second filter section will be set to have a center frequency of 1337.2 Hz and a band width of 6.2 Hz, entering data in said input register to control the parameters of said impulse generator such that the impulse generator will operate at 70.42 Hz.

3. A method for stimulating a voice synthesizer to emit DTMF dialing tone "3" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 693.3 Hz and a band width of 21.9 Hz, entering data in said input register to control the parameters of a second of said filter sections such that the second filter section will be set to have a center frequency of 1480.9 Hz and a band width of 9.4 Hz, entering data in said input register to control the parameters of said impulse generator such that the impulse generator will operate at 86.95 Hz.

4. A method for stimulating a voice synthesizer to emit DTMF dialing tone "4" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 761.1 Hz and a band width of 25.1 Hz, entering data in said input register to control the parameters of a second of said filter sections such that the second filter section will be set to have a center frequency of 1194.4 Hz and a band width of 12.5 Hz, entering data in said input register to control the parameters of said impulse generator such that the impulse generator will operate at 108.70 Hz.

5. A method for stimulating a voice synthesizer to emit DTMF dialing tone "5" conforming with industry specification RS-464, said synthesizer heaving an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 1351.1 Hz and a band width of 12.5 Hz, entering data in said input register to control the parameters of a second of said filter sections such that the second filter section will be set to have a center frequency of 761.1 Hz and a band width of 25.1 Hz, entering data in said input register to control the parameters of said impulse generator such that the impulse generator will operate at 192.31 Hz.

6. A method for stimulating a voice synthesizer to emit DTMF dialing tone "6" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 777.6 Hz and a band width of 21.9 Hz, entering data in said input register to control the parameters of a second of said filter sections such that the second filter section will be set to have a center frequency of 1465.3 Hz and a band width of 9.4 Hz, entering data in said input register to control the parameters of said impulse generator such that the impulse generator will operate at 86.20 Hz.

7. A method for stimulating a voice synthesizer to emit DTMF dialing tone "7" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 854.2 Hz and a band width of 21.9 Hz, entering data in said input register to control the parameters of a second of said filter sections such that the second filter section will be set to have a center frequency of 1212.6 Hz and a band width of 12.5 Hz, entering data in said input register to control the parameters of said impulse generator such that the impulse generator will operate at 172.41 Hz.

8. A method for stimulating a voice synthesizer to emit DTMF dialing tone "8" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 843.4 Hz and a band width of 34.6 Hz, entering data in said input register to control the parameters of a second of said filter sections such that the second filter section will be set to have a center frequency of 1349.7 Hz and a band width of 15.6 Hz, entering data in said input register to control the parameters of said impulse generator such that the impulse generator will operate at 121.95 Hz.

9. A method for stimulating a voice synthesizer to emit DTMF dialing tone "9" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 1466.5 Hz and a band width of 6.2 Hz, entering data in said input register to control the parameters of a second of said filter sections such that the second filter section will be set to have a center frequency of 847.2 Hz and a band width of 15.6 Hz, entering data in said input register to control the parameters of said impulse generator such that the impulse generator will operate at 121.95 Hz.

10. A method for stimulating a voice synthesizer to emit DTMF dialing tone "0" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 936.8 Hz and a band width of 6.2 Hz, entering data in said input register to control the parameters of a second of said filter sections such that the second filter section will be set to have a center frequency of 1355.2 Hz and a band width of 3.1 Hz, entering data in said input register to control the parameters of said impulse generator such that the impulse generator will operate at 104.17 Hz.

11. A method for stimulating a voice synthesizer to emit DTMF dialing tone "*" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 1197.7 Hz and a band width of 6.2 Hz, entering data in said input register to control the parameters of a second of said filter sections such that the second filter section will be set to have a center frequency of 932.1 Hz and a band width of 12.5 Hz, entering data in said input register to control the parameters of said impulse generator such that the impulse generator will operate at 133.33 Hz.

12. A method for stimulating a voice synthesizer to emit DTMF dialing tone "#" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 932.1 Hz and a band width of 12.5 Hz, entering data in said input register to control the parameters of a second of said filter sections such that the second filter section will be set to have a center frequency of 1466.5 Hz and a band width of 6.2 Hz, entering data in said input register to control the parameters of said impulse generator such that the impulse generator will operate at 133.33 Hz.

13. A method for stimulating a voice synthesizer to emit DTMF dialing tone "A" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 689.1 Hz and a band width of 25.1 Hz, entering data in said input register to control the parameters of a second of said filter sections such that the second filter section will be set to have a center frequency of 1631.3 Hz and a band width of 9.4 Hz, entering data in said input register to control the parameters of said impulse generator such that the impulse generator will operate at 232.56 Hz.

14. A method for stimulating a voice synthesizer to emit DTMF dialing tone "B" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 767.1 Hz and a band width of 18.8 Hz, entering data in said input register to control the parameters of a second of said filter sections such that the second filter section will be set to have a center frequency of 1632.3 Hz and a band width of 6.2 Hz, entering data in said input register to control the parameters of said impulse generator such that the impulse generator will operate at 96.15 Hz.

15. A method for stimulating a voice synthesizer to unit DTMF dialing tone "C" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 842.9 Hz and a band width of 6.2 Hz, entering data in said input register to control the parameters of a second of said filter sections such that the second filter section will be set to have a center frequency of 1633.2 Hz and a band width of 3.1 Hz, entering data in said input register to control the parameters of said impulse generator such that the impulse generator will operate at 49.50 Hz.

16. A method for stimulating a voice synthesizer to emit DTMF dialing tone "D" conforming with industry specification RS-464, said synthesizer having an impulse generator for voicing, a plurality of digital filter sections, an analog output, and an input register controlling functional parameters of the impulse generator and the filter sections, including the steps entering data in said input register to control the parameters of a first of said filter sections such that the first filter section will be set to have a center frequency of 1631.3 Hz and a band width of 9.4 Hz, entering data in said input register to control the parameters of a second of said filter sections such that the second filter section will be set to have a center frequency of 927.4 Hz and a band width of 18.8 Hz, entering data in said input register to control the parameters of said impulse generator such that the impulse generator will operate at 116.28 Hz.

17. Apparatus for generating standard dialing DTMF signals as specified by industry specification RS-464 comprising a processor, a memory device, and a voice synthesizer, said synthesizer having an impulse generator for voicing, a plurality of digital filter sections, an analog output, and a specification input register controlling parameters of the impulse generator and the filter sections, said synthesizer, processor, and memory device being interconnected for transfer of data and control signals, said memory device having stored therein 16 addressable data blocks, the first of said data blocks including code effective when entered into said synthesizer input register to set a first of said filter sections to have a center frequency of 700.0 Hz and a band width of 15.6 Hz, a second of said filter sections to have a center frequency of 1199.4 Hz and a band width of 6.2 Hz, and said impulse generator to operate at 100.00 Hz, the second of said data blocks including code effective when entered into said synthesizer input register to set a first of said filter sections to have a center frequency of 703.4 Hz and a band width of 12.5 Hz, a second of said filter sections to have a center frequency of 1337.2 Hz and a band width of 6.2 Hz, and said impulse generator to operate at 70.42 Hz, the third of said data blocks including code effective when entered into said synthesizer input register to set a first of said filter sections to have a center frequency of 693.3 Hz and a band width of 21.9 Hz, a second of said filter sections to have a center frequency of 1480.9 Hz and a band width of 9.4 Hz, and said impulse generator to operate at 86.95 Hz, the fourth of said data blocks including code effective when entered into said synthesizer input register to set a first of said filter sections to have a center frequency of 761.1 Hz and a band width of 25.1 Hz, a second of said filter sections to have a center frequency of 1194.4 Hz and a band width of 12.5 Hz, and said impulse generator to operate at 108.70 Hz, the fifth of said data blocks including code effective when entered into said synthesizer input register to set a first of said filter sections to have a center frequency of 1351.1 Hz and a band width of 12.5 Hz, a second of said filter sections to have a center frequency of 761.1 Hz and a band width of 25.1 Hz, and said impulse generator to operate at 192.31 Hz, the sixth of said data blocks including code effective when entered into said synthesizer input register to set a first of said filter sections to have a center frequency of 777.6 Hz and a band width of 21.9 Hz, a second of said filter sections to have a center frequency of 1465.3 Hz and a band width of 9.4 Hz, and said impulse generator to operate at 86.20 Hz, the seventh of said data blocks including code effective when entered into said synthesizer input register to set a first of said filter sections to have a center frequency of 854.2 Hz and a band width of 21.9 Hz, a second of said filter sections to have a center frequency of 1212.6 Hz and a band width of 12.5 Hz, and said impulse generator to operate at 172.41 Hz, the eighth of said data blocks including code effective when entered into said synthesizer input register to set a first of said filter sections to have a center frequency of 843.4 Hz and a band width of 34.6 Hz, a second of said filter sections to have a center frequency of 1349.7 Hz and a band width of 15.6 Hz, and said impulse generator to operate at 121.95 Hz, the ninth of said data blocks including code effective when entered into said synthesizer input register to set a first of said filter sections to have a center frequency of 1466.5 Hz and a band width of 6.2 Hz, a second of said filter sections to have a center frequency of 847.2 Hz and a band width of 15.6 Hz, and said impulse generator to operate at 121.95 Hz, the tenth of said data blocks including code effective when entered into said synthesizer input register to set a first of said filter sections to have a center frequency of 936.8 Hz and a band width of 6.2 Hz, a second of said filter sections to have a center frequency of 1355.2 Hz and a band width of 3.1 Hz, and said impulse generator to operate at 104.17 Hz, the eleventh of said data blocks including code effective when entered into said synthesizer input register to set a first of said filter sections to have a center frequency of 1197.7 Hz and a band width of 6.2 Hz, a second of said filter sections to have a center frequency of 932.1 Hz and a band width of 12.5 Hz, and said impulse generator to operate at 133.33 Hz, the twelfth of said data blocks including code effective when entered into said synthesizer input register to set a first of said filter sections to have a center frequency of 932.1 Hz and a band width of 12.5 Hz, a second of said filter sections to have a center frequency of 1466.5 Hz and a band width of 6.2 Hz, and said impulse generator to operate at 133.33 Hz, the thirteenth of said data blocks including code effective when entered into said synthesizer input register to set a first of said filter sections to have a center frequency of 689.1 Hz and a band width of 25.1 Hz, a second of said filter sections to have a center frequency of 1631.3 Hz and a band width of 9.4 Hz, and said impulse generator to operate at 232.56 Hz, the fourteenth of said data blocks including code effective when entered into said synthesizer input register to set a first of said filter sections to have a center frequency of 767.1 Hz and a band width of 18.8 Hz, a second of said filter sections to have a center frequency of 1632.3 Hz and a band width of 6.2 Hz, and said impulse generator to operate at 96.15 Hz, the fifteenth of said data blocks including code effective when entered into said synthesizer input register to set a first of said filter sections to have a center frequency of 842.9 Hz and a band width of 6.2 Hz, a second of said filter sections to have a center frequency of 1633.2 Hz and a band width of 3.1 Hz, and said impulse generator to operate at 49.50 Hz, the sixteenth of said data blocks including code effective when entered into said synthesizer input register to set a first of said filter sections to have a center frequency of 1631.3 Hz and a band width of 9.4 Hz, a second of said filter sections to have a center frequency of 927.4 Hz and a band width of 18.8 Hz, and said impulse generator to operate at 116.28 Hz.

18. A method for stimulating a voice synthesizer of the type marketed by General Instrument Corp. as model SP 0250 having an input register with 120 bit positions to emit DTMF dialing tone "1" conforming with industry specification RS-464, including the steps
inputting a 16-bit code expressed as 7BD7(hex) to the synthesizer input register in any one of 16-bit position sequences 1–16, 25–40, 49–64, 73–88, 89–104, 105–120;
inputting a 16-bit code expressed as 7EB8(hex) to the synthesizer input register in any second one of said 16-bit position sequences;
inputting an 8-bit code expressed as 63(hex) to the synthesizer input register in 8-bit position sequence 41–48.

19. A method for stimulating a voice synthesizer of the type marketed by General Instrument Corp. as model SP 0250 having an input register with 120 bit positions to emit DTMF dialing tone "2" conforming with industry specification RS-464, including the steps inputting a 16-bit code expressed as 7CD7(hex) to the synthesizer input register in any one of 16-bit position sequences 1–16, 25–40, 49–64, 73–88, 89–104, 105–120;

inputting a 16-bit code expressed as 7EB0(hex) to the synthesizer input register in any second one of said 16-bit position sequences;

inputting an 8-bit code expressed as 8D(hex) to the synthesizer input register in 8-bit position sequence 41–48.

20. A method for stimulating a voice synthesizer of the type marketed by General Instrument Corp. as model SP 0250 having an input register with 120 bit positions to emit DTMF dialing tone "3" conforming with industry specification RS-464, including the steps inputting a 16-bit code expressed as 79D7(hex) to the synthesizer input register in any one of 16-bit position sequences 1–16, 25–40, 49–64, 73–88, 89–104, 105–120;

inputting a 16-bit code expressed as 7DA7(hex) to the synthesizer input register in any second one of said 16-bit position sequences;

inputting an 8-bit code expressed as 72(hex) to the synthesizer input register in 8-bit position sequence 41–48.

21. A method for stimulating a voice synthesizer of the type marketed by General Instrument Corp. as model SP 0250 having an input register with 120 bit positions to emit DTMF dialing tone "4" conforming with industry specification RS-464, including the steps inputting a 16-bit code expressed as 78D2(hex) to the synthesizer input register in any one of 16-bit position sequences 1–16, 25–40, 49–64, 73–88, 89–104, 105–120;

inputting a 16-bit code expressed as 7CB8(hex) to the synthesizer input register in any second one of said 16-bit position sequences;

inputting an 8-bit code expressed as 5B(hex) to the synthesizer input register in 8-bit position sequence 41–48.

22. A method for stimulating a voice synthesizer of the type marketed by General Instrument Corp. as model SP 0250 having an input register with 120 bit positions to emit DTMF dialing tone "5" conforming with industry specification RS-464, including the steps inputting a 16-bit code expressed as 7CAF(hex) to the synthesizer input register in any one of 16-bit position sequences 1–16, 25–40, 49–64, 73–88, 89–104, 105–120;

inputting a 16-bit code expressed as 78D2(hex) to the synthesizer input register in any second one of said 16-bit position sequences;

inputting an 8-bit code expressed as 33(hex) to the synthesizer input register in 8-bit position sequence 41–48.

23. A method for stimulating a voice synthesizer of the type marketed by General Instrument Corp. as model SP 0250 having an input register with 120 bit positions to emit DTMF dialing tone "6" conforming with industry specification RS-464, including the steps inputting a 16-bit code expressed as 79D1(hex) to the synthesizer input register in any one of 16-bit position sequences 1–16, 25–40, 49–64, 73–88, 89–104, 105–120;

inputting a 16-bit code expressed as 7DA8(hex) to the synthesizer input register in any second one of said 16-bit position sequences;

inputting an 8-bit code expressed as 73(hex) to the synthesizer input register in 8-bit position sequence 41–48.

24. A method for stimulating a voice synthesizer of the type marketed by General Instrument Corp. as model SP 0250 having an input register with 120 bit positions to emit DTMF dialing tone "7" conforming with industry specification RS-464, including the steps inputting a 16-bit code expressed as 79CB(hex) to the synthesizer input register in any one of 16-bit position sequences 1–16, 25–40, 49–64, 73–88, 89–104, 105–120;

inputting a 16-bit code expressed as 7CB7(hex) to the synthesizer input register in any second one of said 16-bit position sequences;

inputting an 8-bit code expressed as 39(hex) to the synthesizer input register in 8-bit position sequence 41–48.

25. A method for stimulating a voice synthesizer of the type marketed by General Instrument Corp. as model SP 0250 having an input register with 120 bit positions to emit DTMF dialing tone "8" conforming with industry specification RS-464, including the steps inputting a 16-bit code expressed as 75CB(hex) to the synthesizer input register in any one of 16-bit position sequences 1–16, 25–40, 49–64, 73–88, 89–104, 105–120;

inputting a 16-bit code expressed as 7BAF(hex) to the synthesizer input register in any second one of said 16-bit position sequences;

inputting an 8-bit code expressed as 51(hex) to the synthesizer input register in 8-bit position sequence 41–48.

26. A method for stimulating a voice synthesizer of the type marketed by General Instrument Corp. as model SP 0250 having an input register with 120 bit positions to emit DTMF dialing tone "9" conforming with industry specification RS-464, including the steps inputting a 16-bit code expressed as 7EA8(hex) to the synthesizer input register in any one of 16-bit position sequences 1–16, 25–40, 49–64, 73–88, 89–104, 105–120;

inputting a 16-bit code expressed as 7BCC(hex) to the synthesizer input register in any second one of said 16-bit position sequences;

inputting an 8-bit code expressed as 51(hex) to the synthesizer input register in 8-bit position sequence 41–48.

27. A method for stimulating a voice synthesizer of the type marketed by General Instrument Corp. as model SP 0250 having an input register with 120 bit positions to emit DTMF dialing tone "0" conforming with industry specification RS-464, including the steps inputting a 16-bit code expressed as 7EC5(hex) to the synthesizer input register in any one of 16-bit position sequences 1–16, 25–40, 49–64, 73–88, 89–104, 105–120;

inputting a 16-bit code expressed as 7FAF(hex) to the synthesizer input register in any second one of said 16-bit position sequences;

inputting an 8-bit code expressed as 5F(hex) to the synthesizer input register in 8-bit position sequence 41–48.

28. A method for stimulating a voice synthesizer of the type marketed by General Instrument Corp. as model SP 0250 having an input register with 120 bit positions to emit DTMF dialing tone "*" conforming with industry specification RS-464, including the steps inputting a 16-bit code expressed as 7EB8(hex) to the synthesizer input register in any one of 16-bit position sequences 1-16, 25-40, 49-64, 73-88, 89-104, 105-120;

inputting a 16-bit code expressed as 7CC5(hex) to the synthesizer input register in any second one of said 16-bit position sequences;

inputting an 8-bit code expressed as 4A(hex) to the synthesizer input register in 8-bit position sequence 41-48.

29. A method for stimulating a voice synthesizer of the type marketed by General Instrument Corp. as model SP 0250 having an input register with 120 bit positions to emit DTMF dialing tone "#" conforming with industry specification RS-464, including the steps inputting a 16-bit code expressed as 7CC5(hex) to the synthesizer input register in any one of 16-bit position sequences 1-16, 25-40, 49-64, 73-88, 89-104, 105-120;

inputting a 16-bit code expressed as 7EA8(hex) to the synthesizer input register in any second one of said 16-bit position sequences;

inputting an 8-bit code expressed as 4A(hex) to the synthesizer input register in 8-bit position sequence 41-48.

30. A method for stimulating a voice synthesizer of the type marketed by General Instrument Corp. as model SP 0250 having an input register with 120 bit positions to emit DTMF dialing tone "A" conforming with industry specification RS-464, including the steps inputting a 16-bit code expressed as 78D7(hex) to the synthesizer input register in any one of 16-bit position sequences 1-16, 25-40, 49-64, 73-88, 89-104, 105-120;

inputting a 16-bit code expressed as 7DA1(hex) to the synthesizer input register in any second one of said 16-bit position sequences;

inputting an 8-bit code expressed as 2A(hex) to the synthesizer input register in 8-bit position sequence 41-48.

31. A method for stimulating a voice synthesizer of the type marketed by General Instrument Corp. as model SP 0250 having an input register with 120 bit positions to emit DTMF dialing tone "B" conforming with industry specification RS-464, including the steps inputting a 16-bit code expressed as 7AD2(hex) to the synthesizer input register in any one of 16-bit position sequences 1-16, 25-40, 49-64, 73-88, 89-104, 105-120;

inputting a 16-bit code expressed as 7EA1(hex) to the synthesizer input register in any second one of said 16-bit position sequences;

inputting an 8-bit code expressed as 67(hex) to the synthesizer input register in 8-bit position sequence 41-48.

32. A method for stimulating a voice synthesizer of the type marketed by General Instrument Corp. as model SP 0250 having an input register with 120 bit positions to emit DTMF dialing tone "C" conforming with industry specification RS-464, including the steps inputting a 16-bit code expressed as 7ECD(hex) to the synthesizer input register in any one of 16-bit position sequences 1-16, 25-40, 49-64, 73-88, 89-104, 105-120;

inputting a 16-bit code expressed as 7FA1(hex) to the synthesizer input register in any second one of said 16-bit position sequences;

inputting an 8-bit code expressed as C9(hex) to the synthesizer input register in 8-bit position sequence 41-48.

33. A method for stimulating a voice synthesizer of the type marketed by General Instrument Corp. as model SP 0250 having an input register with 120 bit positions to emit DTMF dialing tone "D" conforming with industry specification RS-464, including the steps inputting a 16-bit code expressed as 7DA1(hex) to the synthesizer input register in any one of 16-bit position sequences 1-16, 25-40, 49-64, 73-88, 89-104, 105-120;

inputting a 16-bit code expressed as 7AC5(hex) to the synthesizer input register in any second one of said 16-bit position sequences;

inputting an 8-bit code expressed as 55(hex) to the synthesizer input register in 8-bit position sequence 41-48.

* * * * *